US008640187B2

(12) United States Patent
Walsh

(10) Patent No.: US 8,640,187 B2
(45) Date of Patent: Jan. 28, 2014

(54) SYSTEMS AND METHODS FOR PROVIDING AN FULLY FUNCTIONAL ISOLATED EXECUTION ENVIRONMENT FOR ACCESSING CONTENT

(75) Inventor: Daniel J. Walsh, Marlborough, MA (US)

(73) Assignee: Red Hat, Inc., Raleigh, NC (US)

( * ) Notice: Subject to any disclaimer, the term of this patent is extended or adjusted under 35 U.S.C. 154(b) by 394 days.

(21) Appl. No.: 12/789,554

(22) Filed: May 28, 2010

(65) Prior Publication Data

US 2011/0296487 A1 Dec. 1, 2011

(51) Int. Cl.
*G06F 21/00* (2013.01)

(52) U.S. Cl.
USPC ..................................... 726/1; 726/4; 726/24

(58) Field of Classification Search
USPC ................................................ 726/1, 24, 26
See application file for complete search history.

(56) References Cited

U.S. PATENT DOCUMENTS

| | | | | |
|---|---|---|---|---|
| 7,461,144 | B1 * | 12/2008 | Beloussov et al. | 709/223 |
| 2002/0184520 | A1 * | 12/2002 | Bush et al. | 713/200 |
| 2006/0048099 | A1 * | 3/2006 | Templin et al. | 717/124 |
| 2009/0276771 | A1 * | 11/2009 | Nickolov et al. | 717/177 |
| 2011/0047613 | A1 | 2/2011 | Walsh et al. | |
| 2011/0154431 | A1 * | 6/2011 | Walsh | 726/1 |

OTHER PUBLICATIONS

Daniel J. Walsh, Systems and Methods for Inhibiting Denial-Of-Service Attacks Using Group Controls, U.S. Appl. No. 13/029,702, filed Feb. 17, 2011.

* cited by examiner

*Primary Examiner* — Kambiz Zand
*Assistant Examiner* — Ali Shayanfar
(74) *Attorney, Agent, or Firm* — Lowenstein Sandler LLP

(57) ABSTRACT

A sandbox tool can cooperate with components of a secure operating system to create an isolated execution environment for accessing content without exposing other processes and resources of the computing system to the untrusted content. The sandbox tool can create the isolated execution environment with an assigned security context of the secure operating system. The security context can define the security policies applied by the operating system to the isolated execution environment, thereby, defining the levels of access the isolated execution environment has to the resources of the computing system.

20 Claims, 7 Drawing Sheets

SYSTEMS AND METHODS FOR PROVIDING AN FULLY FUNCTIONAL ISOLATED EXECUTION ENVIRONMENT FOR ACCESSING CONTENT

FIELD

This invention relates generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Often, the users are unaware of the origin of the content available in the public networks. Malicious entities utilize this ease of accessibility and anonymity to attack the users. For example, the malicious entities can plant viruses, Trojans, or other malicious agents in publicly available content in order to attack the users' computing systems and steal sensitive information from the users. As such, the users must treat content from unknown sources as untrusted and possibly dangerous.

Typically, to prevent attacks, the users utilize filtering programs, anti-virus programs, etc. in order to identify and block known dangerous content. These programs, however, suffer from several weaknesses. In order to properly identify and block the dangerous content, the filtering and anti-virus programs must typically be configured with the identity of the source of known dangerous content. As such, the filtering and anti-virus programs lack the ability to stop previously unknown and emerging threats. Likewise, the filtering and anti-virus programs are themselves subject to attack. Many types of dangerous content utilize weaknesses in the filtering and anti-virus programs to attack the users' computing systems using the filtering and anti-virus programs as a vehicle for attaching the users' computing systems. As such, the users lack methods to guarantee that untrusted content does not pose a threat.

Currently, operating systems allow a user to place access controls on a process, such as an application program, running on the operating system. When an action by the application program exceeds it level of access, the operating system blocks the action, and the application program immediate shuts down. This prevents possible damage to the user's computing system, but it also prevents the user from using the application program. To utilize the application program, the user is required to increase the level of access granted to the application program. Thus, the user has no method to run the application program and also protect the user's computing system from potential danger.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
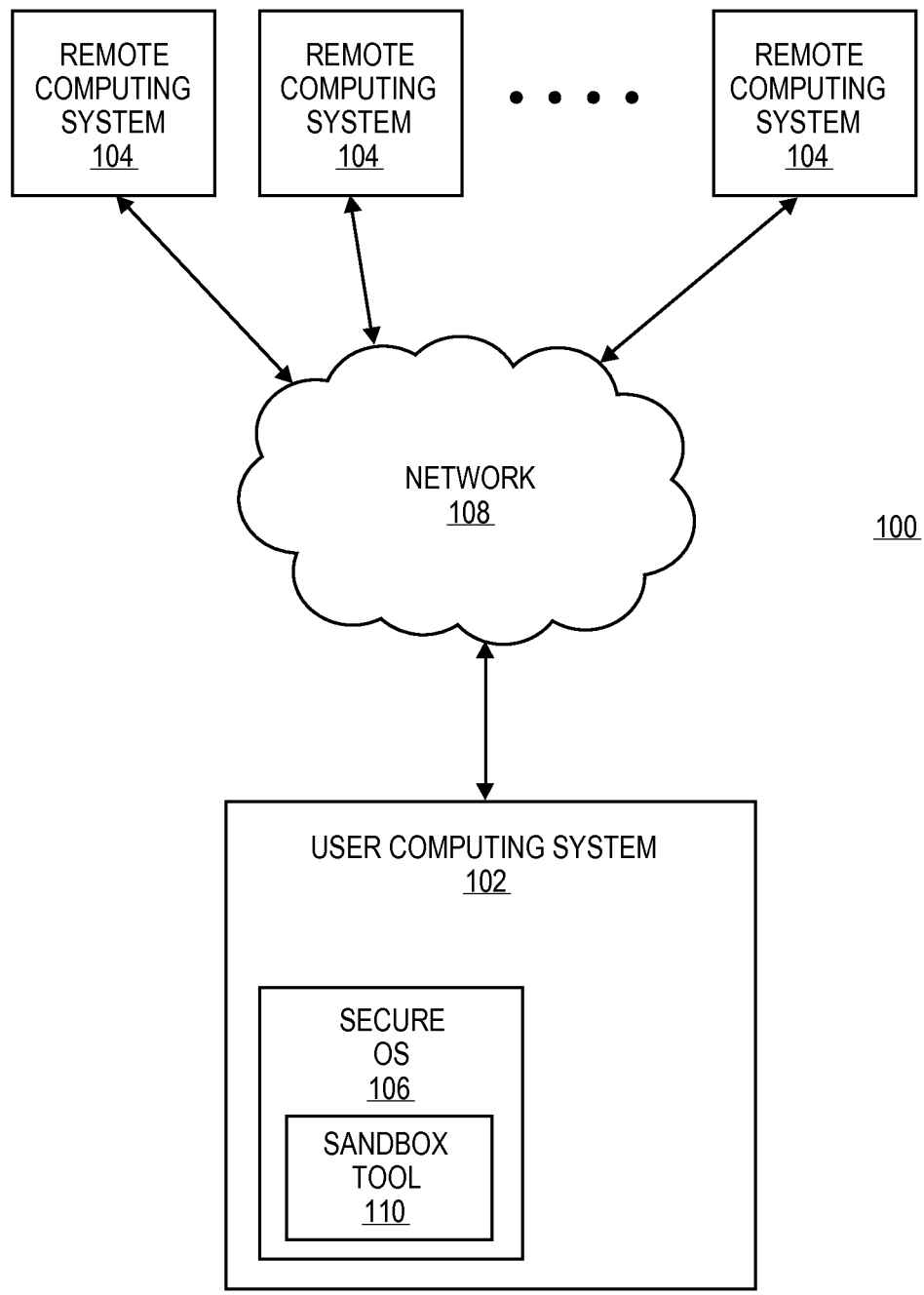
FIG. 1 illustrates a network of computing systems in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for accessing, viewing, and running content, such as data, files, programs, and applications, without exposing a computing system to untrusted content and possibly malicious content. More particularly, a "sandbox tool" can create an isolated execution environment that is isolated from other processes executing on the computing system for accessing content. The sandbox tool can cooperate with components of a secure operating system (OS), such as security enhanced LINUX (SELinux), to create an isolated execution environment for accessing content without exposing other processes and resources of the computing system to the content. As such, the user can access the content without exposing the overall computing system to any possible malicious or dangerous content.

According to embodiments, the sandbox tool can be configured to receive a request to create an isolated execution environment. The request can include specifications of the isolated execution environment such as the content to be accessed in the isolated execution environment, a security context of the isolated execution environment, and a namespace for the isolated execution environment. The security context can define the security policies applied by the operating system to the isolated execution environment, thereby, defining the levels of access the isolated execution environment has to the resources of the computing system. The security context can be predefined levels or roles of the secure OS.

According to embodiments, once the request is received, the sandbox tool can cooperate with the secure OS to create the isolated execution environment. The sandbox tool can be configured to generate the namespace for the isolated execution environment and unshare the namespace within any other namespace supported by the secure OS. The sandbox tool can be configured to generate a new virtual process server, such as an X Server providing an X Windows interface, for the isolated execution environment and apply the security context to the new virtual process server. Any processes running in the isolated execution environment will run at the applied security context.

According to embodiments, once the new virtual process server is created, the sandbox tool, in cooperation with the secure OS, can initiate the isolated execution environment and provide an interface to the user to access the isolated execution environment. The interface can be provided within the existing user or "desktop" interface. Accordingly, the sandbox tool provides a separate "desktop" within the user's existing desktop, which is isolated from the user's desktop, to access content.

By utilizing the sandbox tool, content can be accessed on a computing system without exposing the computing system to any malicious agents that may be contained in the content. Because the virtual process server of the isolated execution environment is assigned a security context, application programs can be allowed to execute in the isolated execution environment, but are restricted from accessing resources of the computing system that are outside its security context. As such, the content can be accessed without the worry of damage to the computing system.

FIG. 1 illustrates an exemplary network 100 of computing systems, according to various embodiments. It should be readily apparent to those of ordinary skill in the art that the network 100 depicted in FIG. 1 represents a generalized schematic illustration and that other components may be added or existing components may be removed or modified. Moreover, the network 100 may be implemented using software components, hardware components, or combinations thereof.

As illustrated in FIG. 1, the network 100 can represent the systems of private entities, such as individuals, businesses, partnerships, companies, corporations, etc., and public entities, such as universities, governmental agencies, etc. The network 100 can include a number of computing systems, such as a user computing system 102 and remote computing systems 104. The computing systems, such as the user computing system 102 and remote computing systems 104, can include hardware resources, such as processors, memory, network hardware, storage devices, and the like, and software resources, such as operating systems (OS), application programs, and the like.

The user computer system 102 can include a secure OS 106, such as security enhanced Linux ("SELinux"), available from Red Hat™, Inc. In this example, SELinux implements a monolithic kernel which is configured to provide an X-Window computing environment to the user computing system 102. SELinux is a version of Linux that integrates FLASK architectural components to provide general support for the enforcement of many kinds of mandatory security policies, including those based on the concepts of type enforcement, role-based access control ("RBAC"), and multi-level security ("MLS").

The computing systems in environment 100 can be located at any location, whether located at single geographic location or remotely located from each other. In order to communicate and share data, the user computing system 102 and the remote computing systems 104 can be coupled to one or more networks 108. The one or more networks 108 can be any type of communications networks, whether wired or wireless, to allow the computing system to communicate, such as wide-area networks (e.g. Internet) or local-area networks.

A user of the user computing system 102 can utilize the computing environment of the secure OS 106 to operate the computing system 102 and access content on the user computing system 102. The content can include any number and type of data, applications programs such as word processing applications, web browser applications, file sharing applications, electronic mail (e-mail) applications, multimedia applications, chat applications, etc. Likewise, the content can include files and data utilized by the application programs or accessed utilizing the application programs. The content accessed on the user computing system 102 can be acquired from a variety of sources. For example, the content can be installed and copied to the user computing system 102 from media such as compact discs (CDs) and digital versatile discs (DVDs). Likewise, the content can be downloaded from one or more of the remote computing systems 104 via the network 108.

The content accessed on the user computing system 102 may not be secure. For example, the user computing system 102 can acquire the content from one or more of the remote computing systems 104. In this example, the user computing system 102 may not know the source of the content and cannot guarantee that the content is secure. Likewise, content installed and copied from media can be untrusted and possibly insecure. As such, the content can be deemed to be untrusted and can possibly be insecure.

In embodiments, regardless of whether the content is trusted or untrusted, the user of the user computing system 102 can desire to access the content without exposing the user computing system 102 to actions performed by the content or malicious agents (e.g. viruses, Trojans, etc.) possibly contained in the content. In order to allow access of the content without exposing the user computing system 102, the user computing system 102 can include a sandbox tool 110. The sandbox tool 110 can be configured to cooperate with components of the secure OS 106 to create an isolated execution environment for accessing content (trusted or untrusted) without exposing other processes and resources of the user computing system 102 to the content. In particular, the sandbox tool 110 can be configured to allocate resources (storage space, memory, etc) of the user computing system 102, which are necessary to create the isolated execution environment, and apply security polices of the secure OS 106 to the isolated execution environment such that content running in the isolated execution environment can only access the resources allocated to the isolated execution environment. As such, the user can access the content without exposing the user computing system 102 to any possible malicious, dangerous, or damaging content.

The content (trusted or untrusted) can be applications, programs, files, and/or data. The sandbox tool 110 can be configured to create the isolated execution environment to allow the applications, programs, files, and/or data to be accessed, executed, or viewed without exposing the user computing system 102 to any possible malicious, dangerous, or damaging actions of the content. For example, the applications, programs, files, and/or data can only access the resources allocated to the isolated execution environment.

In embodiments, as illustrated, the sandbox tool 110 can be implemented as part of the secure OS 106. Likewise, the sandbox tool 110 can be implemented as a standalone application program that communicates with the components of the secure OS 106. In either case, the sandbox tool 110 can be written in any type of known open-source or proprietary programming language, such as C, C++, JAVA, etc.

In embodiments, the user computing system 102 can store and execute the secure OS 106 and sandbox tool 110. Additionally, one or more of the remote computing systems 104 can store and execute the secure operating system 106 and the sandbox tool 110. As such, the user computing system 102 can access the secure OS 106 and the sandbox 110 stored on the one or more remote computing system 104 via the network 108 in order to access content using a client-server model.

Figure 2:
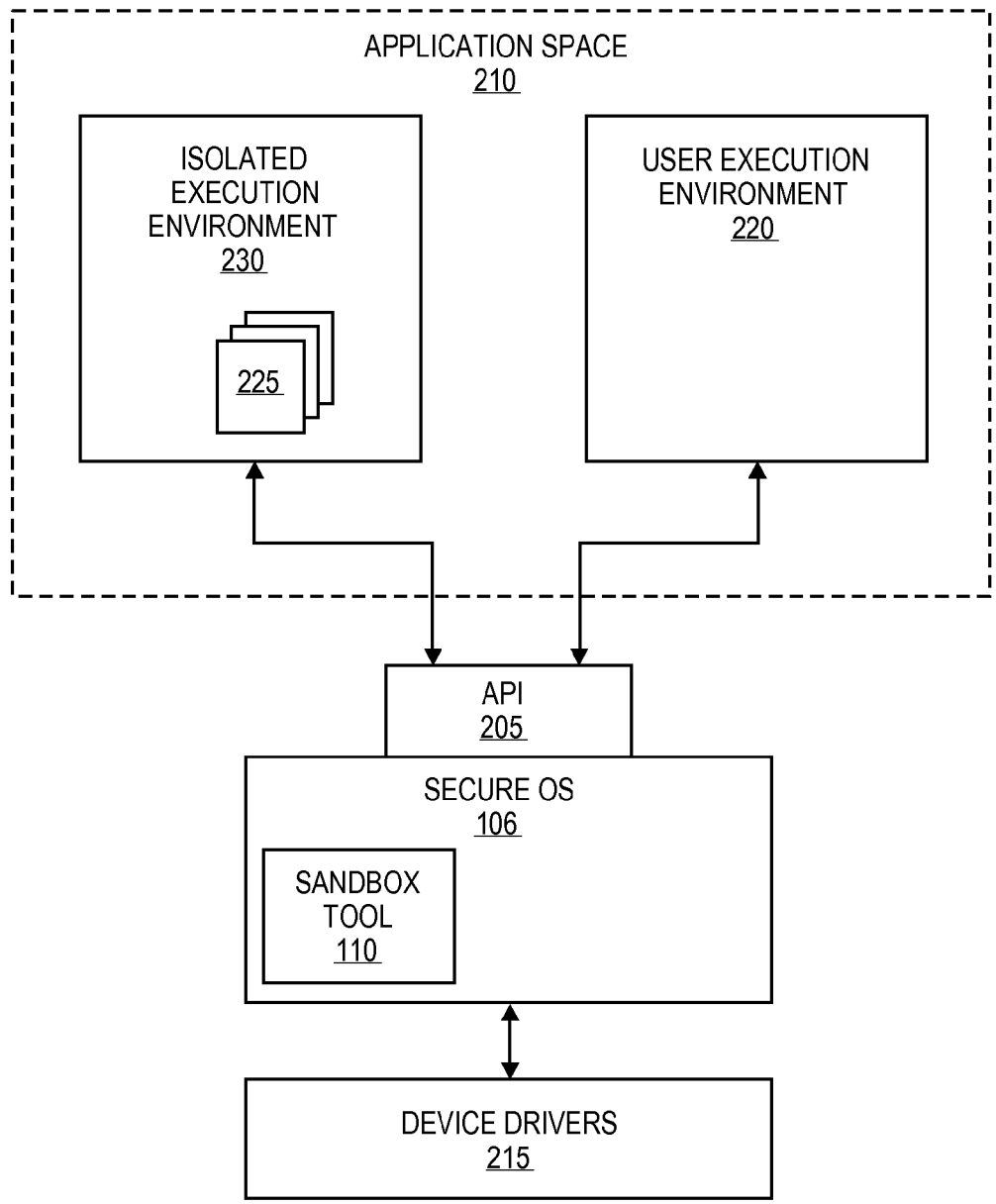
FIG. 2 illustrates an exemplary software environment for utilizing an isolated execution environment, according to various embodiments of the present teachings.

FIG. 2 illustrates an exemplary software environment in accordance with various embodiments. It should be readily apparent to those of ordinary skill in the art that software environment depicted in FIG. 2 represents a generalized schematic illustration and that other components may be added or existing components may be removed or modified.

As shown in FIG. 2, the software environment can include the secure OS 106, such as SELinux or similar secure multi-tasking, multi-user operating system. A run-time environment (not shown) can be configured to execute on the secure OS 106. The run-time environment can provide a set of software that supports the access of content (e.g. applications, files, data, etc.). The run-time environment can also comprise an application program interface ("API") 205 and a complementary API (not shown) within an application space 210. The API 205 can be configured to provide a set of routines that the application space 210 uses to request lower-level services performed by the secure OS 106. The secure OS 106 can include a kernel (not shown) and device drivers 215. The kernel can be configured to provide secure access to the underlying hardware of the user computing system 102 (e.g. processor, memory, storage, input/output devices, network devices, etc.) through the device drivers 215.

During operation, the secure OS 106 can be configured to create a user execution environment 220 in the application space 210. The user execution environment 220 allows users to interact with the user computing system 102 to access content such as run application and programs, view files, etc. The secure OS 106 can be configured to perform the necessary processes to establish the user execution environment 220 such as creating a virtual process server (e.g. X-server) to support user interaction with the user execution environment 220, providing access to the devices drivers 215, allocating resources (e.g. user namespace such as home directory and temporary directory) to support the user execution environment 220, and the like. Likewise, the secure OS 120 can enforce security policies in the user execution environment 220 to allow/prevent access to underlying resources (network ports, file directories, memory, etc.) of the user computing system 102. The secure OS 106 can also be configured to generate and display, to the user, a user interface, typically a "desktop" graphical user interface (GUI), that allows the user to interact with the user computing system 102. The desktop GUI communicates with the virtual process server to receive input from the user and display output to the user.

In embodiments, in order to provide access to content 225 without endangering the user computing system 102, the sandbox tool 110 can be configured to cooperate with components of a secure OS 106, to create an isolated execution environment 230 for accessing content 225 (trusted or untrusted) without exposing other processes such as the user execution environment 220 and resources of the user computing system 102 to the content 225. In particular, the sandbox tool 110 can be configured to allocate resources (storage space, memory, etc) of the user computing system 102, which are necessary to create the isolated execution environment 230. The sandbox tool 110 can be configured to apply security polices of the secure OS 106 to the isolated execution environment 230 such that the content 225 running in the isolated execution environment 230 can only access the resources allocated to the isolated execution environment 230. The isolated execution environment 230 can provide the same functionality as the user execution environment 220, but be isolated from the user execution environment 220 and limited in its access to the resources of the user computing system 102.

In embodiments, to create the isolated execution environment 230, the sandbox tool 110 can be configured to cooperate with the secure OS 106 to create a namespace for the isolated execution environment 230 (e.g. home directory and tmp directory) which is separate from the namespace of the user execution environment 220. The sandbox tool 110 can be configured to copy (or instruct the secure OS 106 to copy) any content necessary to create the isolated execution environment 230 (e.g. application programs, files, data, etc) to the separate namespace of the isolated execution environment 230. The necessary content can be any files, application programs, data, etc. that allows the isolated execution environment 230 to have the same functionality as the user execution environment 220. Likewise, the sandbox tool 110 can be configured to copy (or instruct the secure OS 106 to copy) the content 225 to the separate namespace and can be configured to optionally create an execution file in the separate namespace for accessing the content 225, for example, initiating and executing applications to view data and files.

In embodiments, the sandbox tool 110 can be configured to cooperate with the secure OS 106 to isolate the isolated execution environment 230 from the user execution environment 220. For example, the sandbox tool 110 can instruct the secure OS 106 to unshare any other namespaces (e.g. the user name space of the user execution environment 220) with the separate namespace of the isolated execution environment 230 and to mount the separate namespace over any existing namespaces so that the processes of isolated execution environment 230 cannot access files and processes of any other namespace except the separate namespace.

In embodiments, the sandbox tool 110 can be configured to cooperate with the secure OS 106 to start a new virtual process server, such as an X Server providing an X Windows interface, for the isolated execution environment 230. The new virtual process server can be configured to provide a separate interface to interact with the isolated execution environment 230. The secure OS 106 can be configured to generate and display the separate interface within the user interface (e.g. desktop GUI) of the user execution environment 220. This allows the user to interact with the isolated execution environment 230 from user interface of the user execution environment 220. The new virtual process server can run with other virtual process servers supported by the secure OS 106, such as the virtual process server supporting the user execution environment 220.

In embodiments, the sandbox tool 110 can be configured to cooperate with the secure OS 106 to associate a security context of the secure OS 106 with the isolated execution environment 230. The security context can be a level, role, etc. supported by the secure OS, for example, MLS level or RBAC role provided by SELinux. The security context can identify the security policies applied by the secure OS 106 to the isolated execution environment 230, thereby, defining the levels of access any other processes in the isolated execution environment 230 have to the resources of the user computing system 102 via the device drivers 215. The sandbox tool 110 can assign (or instruct the secure OS 106 to assign) the security context to the virtual process server of the isolated execution environment 230. When processes are run in the isolated execution environment 230, the sandbox tool 110 can assign (or instruct the secure OS 106 to assign) a security label to the processes that are within the security context of the isolated execution environment 230. Likewise, the secure OS 106 can utilize the security label to allow processes with a particular security label (i.e. processes of a particular isolated execution environment 230) to access only processes within the same security context (e.g. other processes of the particular isolated execution environment 230). Accordingly, the secure OS 106 can be aware of the new virtual process server and any processes utilizing the new virtual process server, such as the content 225, can only access processes and resources allowed by the security context of the isolated execution environment 230.

In embodiments, to allow the user to initiate and interact with the sandbox tool 110, the sandbox tool 110 can be configured to generate and provide to the user command line interfaces and/or GUIs that enable the user to request creation of the isolated execution environment 230. The user can utilize the command line interfaces or GUIs to request creation of the isolated execution environment 230 and to provide specifications of the isolated execution environment 230. The specifications can include a namespace for the isolated execution environment 230, security context for the isolated execution environment 230, content to access in the isolated execution environment 230, and the like.

In embodiments, the sandbox tool 110 can be configured to create and/or maintain one or more isolated execution environments 230, simultaneously. The multiple isolated execution environments 230 can have the same security context, for example, the same levels of access to the resources of the user computing system 102. Likewise, the multiple isolated execution environment 230 can have a different security context, for example, different levels of access to the resources of the user computing system 102. In order to keep the multiple isolated execution environments 230 isolated from each other, the sandbox tool 110 can be configured to assign (or instruct the secure OS 106 to assign) different security labels within the security context assigned, for example random security labels, to the processes of the multiple isolated execution environments 230. As such, the sandbox tool 110 can create one or more isolated execution environments 230 which co-exist and have the same or different level of access, but remain isolated from each other.

Figure 3:
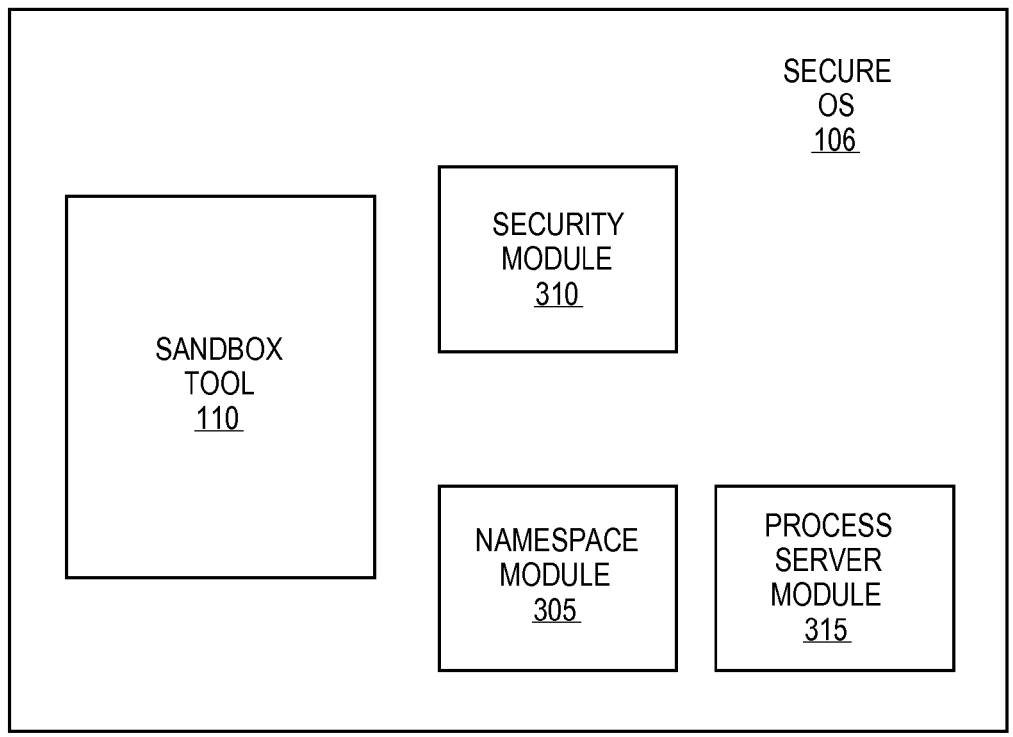
FIG. 3 illustrates components of an exemplary secure operating system including a sandbox tool, according to various embodiments.

FIG. 3 shows an exemplary block diagram of the secure OS 106 including the sandbox tool 110 according to various embodiments. It should be readily apparent to those of ordinary skill in the art that the secure OS 106 depicted in FIG. 3 represents a generalized schematic illustration and that other components may be added or existing components can be removed or modified. Likewise, while FIG. 3 illustrates the sandbox tool 110 as part of the secure OS 106, those of ordinary skill in the art will realize that the sandbox tool 110 can be implemented as a separate and standalone program or application that can communicate and cooperate with the secure OS 106, and the sandbox tool 110 can incorporate one or more of the components of the secure OS 106.

As shown in FIG. 3, the secure OS 106 can include a namespace module 305, a security module 310, a process server module 315. These components can be incorporated into the secure OS 106 and/or the sandbox tool 110 to implement the functionality of the isolated execution environment 230 as previously described and described in greater detail below.

The namespace module 305 can be configured generate and maintain the namespaces that support the user execution environment 220 and the isolated execution environment 230. More particularly, the namespace module 305 can create directories including a home directory (Homedir), file directory (/tmp) and /var/tmp for the user execution environment 220 and, when necessary, create a home directory and tmp directory for the isolated execution environment 230. Likewise, the namespace module 305 can be configured to remove the namespace of the isolated execution environment 230, if requested.

The security module 310 can be configured to maintain and enforce the security policies of the secure OS 106 according to the security contexts supported by the secure OS 106. The security policies associated with the security contexts can define the various access levels of the processes running on the user computing system 102. For example, the security policies can define the various resources that are accessible at different security contexts such as full or limited network access, full or limited memory access, full or limited storage access, and the like. To enforce the security policies, the security module 310 can be configured to associate a security context with the user execution environment 220 and the isolated execution environment 230. Likewise, the security module 310 can be configured to apply security labels, corresponding to the associated security context, to different processes running on the user computing system 102 by assigning a security label, for example MCS label in SELinux, to different processes. The security label is associated with the secure OS 106 and can identify what security context the security module 310 should apply to the processes running on the user computer system 102. When the processes, which are assigned a particular security label, request access to resources of the user computing system 102, the secure OS 106 can read the security label and apply the associated security policy of the associated security context to the processes, thereby restricting access of the processes to the security context. For example, the security module 310 can allow processes associated with a particular security context and with a particular security label to only access the resources, for example, limit and control access to the device drivers 215, defined by the security policies associated with the particular security context.

In embodiments, the process server module 315 can be configured to implement virtual processes servers for the processes running on the user computing system 102 such as the user execution environment 220 and the isolated execution environment 230. For example, if secure OS 106 is SELinux, the process server module 310 can be configured to implement one or more X Servers which provide X Windows interfaces that allow the user of the user computing system 102 to interact with the processes running on the user computing system 102.

In embodiments, the sandbox tool 110 can be configured to include the necessary logic, instructions, and commands to implement the methods and processes of creating the isolated execution environment 230 as described above and below. The sandbox tool 110 can be configured to cooperate with the secure OS 106 to create the execution environment 230 (e.g. creating/removing namespaces, isolating namespaces, copying content, applying security contexts, accessing the untrusted content 225, and the like).

In embodiments, the sandbox tool 110 can be configured to apply various security contexts, supported by the secure OS 106, to the isolated execution environment 230. For example, the sandbox tool 110 or secure OS 106 can define various security contexts for the isolated execution environment 230 from completely isolated (access to resources only necessary to access the untrusted content 225) to limited access (limited access to memory, network, storage, etc.). In the case of limited access, the sandbox tool 110 can be configured to apply security contexts that restrict access to a particular type of resource (e.g. network, memory, storage, processors) and/ or that limits access to the different types of resources (e.g. certain network ports, certain memory ranges, certain storage location, certain processors).

In embodiments, the sandbox tool 110 can be configured to create and/or maintain one or more isolated execution environments 230, simultaneously. The multiple isolated execution environments 230 can have the same security context, for example, the same levels of access to the resources of the user computing system 102, or different security contexts. In order to keep the multiple isolated execution environments 230 isolated from each other, the sandbox tool 110 can be configured to assign (or instruct the security module 310 to assign) different security labels within the assigned security context, for example random security labels, to each of the multiple isolated execution environments 230. As such, the sandbox tool 110 can create one or more isolated execution environments 230 which co-exist and have the same level of access or different level of access, but remain isolated from each other.

In embodiments, in order to initiate creation of the isolated execution environment 230, the sandbox tool 110 can be configured to allow a user to request creation of the isolated execution environment 230. As such, the sandbox tool 110 can be configured to include the necessary logic, instructions, and commands to generate command line interfaces and/or GUIs that allow a user to start the sandbox tool 110, request creation of the isolated execution environment 230, and provide the specifications of the isolated execution environment 230. The specifications can include content 225 to access in the isolated execution environment 230, a security context to apply to the isolated execution environment 230, and a namespace for the isolated execution environment 230. For instance, the sandbox tool 110 can be directly accessed in order to initiate creation of the isolated execution environment 230. Additionally, the sandbox tool 110 can be linked to other applications and programs (e.g. web browsers) to allow creation of the isolated execution environment 230.

In embodiments, additionally, in order to initiate creation of the isolated execution environment, the sandbox tool 110 can be configured to automatically initiate access of the content in the isolated execution environment 230. For example, upon the access of certain content, such as particular files or applications, the sandbox tool 110 can automatically initiate creation of the isolated execution environment 230 and access of the content in the isolated execution environment 230. As such, the sandbox tool 110 can be configured to include the necessary logic, instructions, and commands to command line interfaces and/or GUIs that allow selection of types of content 225 which will automatically be accessed in the isolated execution environment 230 and the security context to be applied to the isolated execution environment 230.

Figure 4:
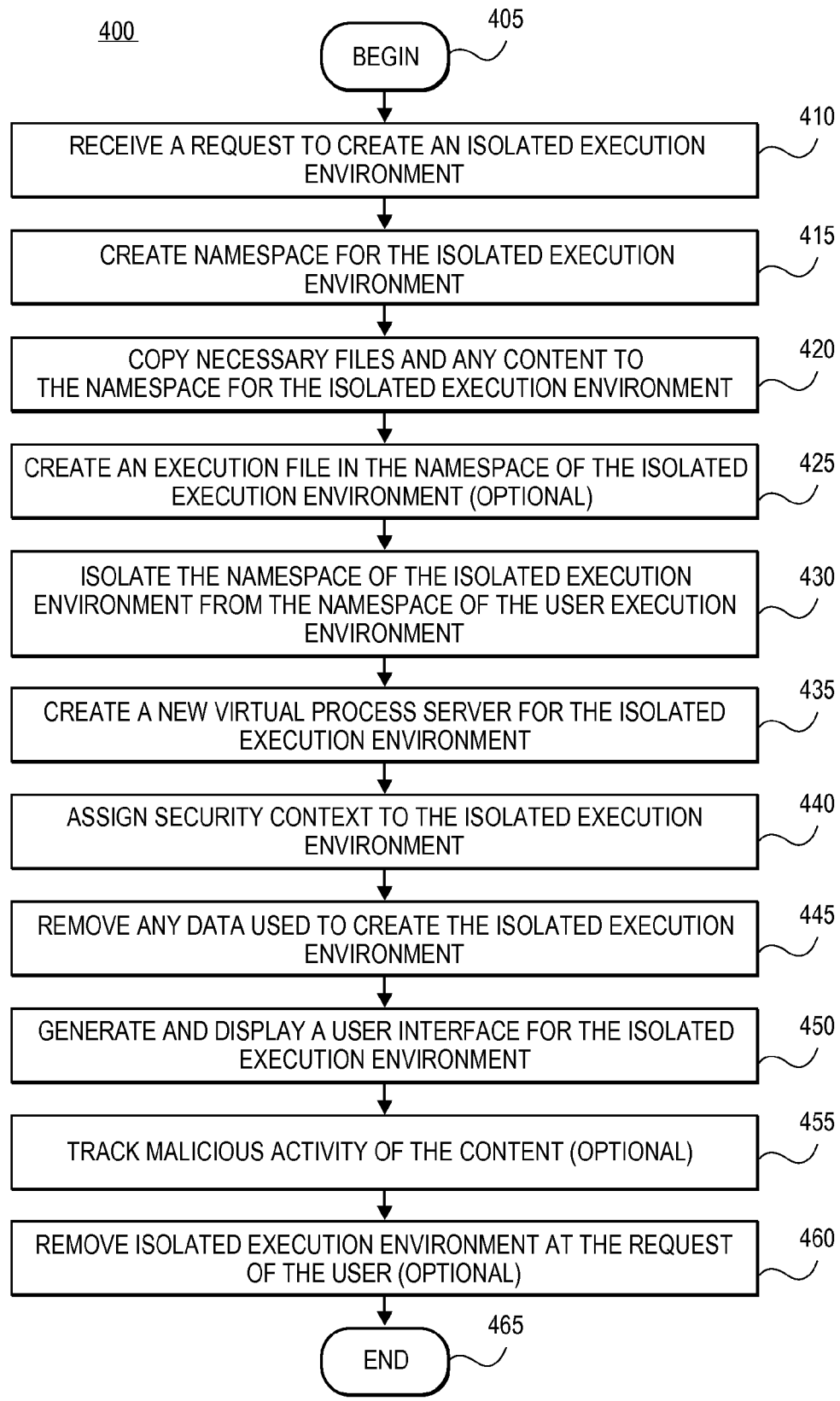
FIG. 4 illustrates an exemplary process for accessing unfrosted content in the isolated execution environment, according to various embodiments.

FIG. 4 depicts an exemplary flow diagram 400 for creating an isolated execution environment in accordance with various embodiments. It should be readily apparent to those of ordinary skill in the art that the flow diagram 400 depicted in FIG. 4 represents a generalized schematic illustration and that other stages can be added or existing stages can be removed or modified.

In 405, the processing can begin. In 410, the sandbox tool 110 can receive a request to create an isolated execution environment 230. To receive the request, the sandbox tool 110 can provide to the user an interface (command line interface and/or GUI) to receive the request and specifications for the isolated execution environment 230. The specifications received in the request can include a namespace for the isolated execution environment 230, the content 225 to be accessed in the isolated execution environment 230, and security context for the isolated execution environment 230.

In 415, the sandbox tool 110 can create the namespace for the isolated execution environment 230. For example, the sandbox tool 110 can instruct the namespace module 305 to create a namespace for the isolated execution environment 230, such as a home directory and tmp directory. The namespace module 205 can label the namespace as specified in the request. Likewise, the namespace module 205 can label the namespace with a default label associated with the security context such as "/sandbox/Topsecret" for the home directory and "/sandbox/tmp/Topsecret" for the tmp directory.

In 420, the sandbox tool 110 can copy necessary content and content 225 to the namespace for the isolated execution environment 230. For example, the sandbox tool 110 can copy or can instruct the secure OS 106 to copy the necessary content and the content 225 to the home directory and tmp directory in the same location it would be found in the home directory and tmp directory of the user execution environment 220. The necessary content can be any content (files, applications, programs) which is required by the isolated execution environment 230 to function similarly as the user execution environment 220. The content 225 can be application programs, files, data, etc. that the user specified in the request.

In 425, the sandbox tool 110 can optionally create an execution file in the namespace of the isolated execution environment 230. If the user specifies the content 225 to be accessed, the execution file can be configured to cause the content 225 to execute once the isolated execution environment 230 is completely created. For example, if the content 225 is an untrusted program or application, the execution file can cause the untrusted program or application to begin execution. Likewise, if the content 225 is an untrusted file and/or data, the execution file can cause the appropriate applications or programs to begin execution in order to view and access the untrusted data and/or files.

In 430, the sandbox tool 110 can isolate the namespace of the isolated execution environment 230 for other namespaces such as the namespace of the user execution environment 220. For example, the sandbox tool 110 can instruct the namespace module 305 to unshare the namespace of the user execution environment 220 to prevent access to processes in the user execution environment 220. Then, the sandbox tool 110 can instruct the namespace module 305 to mount the namespace of the isolated execution environment 230 over the namespace of the user execution environment 220, thereby preventing any access by the content 225 to the user execution environment 220.

In 435, the sandbox tool 110 can create a new virtual process server for the isolated execution environment 230. For example, the sandbox tool 110 can instruct the process server module 315 to create a new virtual process server for the isolated execution environment 230.

In 440, the sandbox tool 110 can apply the security context to the isolated execution environment 230. For example, the sandbox tool 110 can apply or can instruct the security module 310 to apply a security security context, which identifies the security policies, to the new virtual process server of the isolated execution environment. The security context can be predetermined for the content 225 and/or provided by the user of the computing system 102. The new virtual process server will run according to the applied security context, for example, "sandbox_xserver_t:Topsecret".

For processes running in the isolated execution environment 230, the sandbox tool 110 can apply or can instruct the security module 310 to apply security labels within the security context to the processes running the isolated execution environment 230. For example, if secure OS 106 is SELinux, the sandbox tool 110 can apply or can instruct the security module 310 to apply a MCS label, such as "MCS1" to the processes. The sandbox tool 110 can create and/or maintain one or more isolated execution environments 230, simultaneously. The multiple isolated execution environments 230 can have the same security context or different security context. In the above example, in order to keep the multiple isolated execution environments 230 isolated from each other, the sandbox tool 110 can assign (or instruct the security module 310 to apply) different MCS labels within the applied security context, for example random MCS labels, to processes in each of the multiple isolated execution environments 230. As such, the sandbox tool 110 can create one or more isolated execution environments 230 which co-exist and have the same level of access or different levels of access, but remain isolated from each other.

In 445, the sandbox tool 110 can remove any data used to create the isolated execution environment 230. In 450, the sandbox tool 110 can generate and display a user interface for the isolated execution environment 230. For example, if the new virtual process server is an X Windows server, the sandbox tool 110 can instruct, directly or via the process server module 315, to generate and maximize the X windows, generated by the X Server, in the user interface of the user execution environment 220 (e.g. desktop GUI). Because a security context has been applied to the isolated execution environment 230, a windows manager of the new virtual process server will run according to the security context.

In 455, the sandbox tool 110 can optionally track malicious activity of the content 225. The sandbox tool 110 can track or instruct the security module 310 to track malicious activity from the content 225. For example, the sandbox tool 110 and/or security module 310 can monitor for requests to access resources outside the security context of the isolated execution environment 230. The sandbox tool 110 and/or the security module 310 can store a record of the malicious activity and/or notify the user of the malicious activity. Because the malicious activity is outside the security context of the isolated execution environment, the secure OS 106 can prevent the malicious activity from gaining access to the resources and processes of the user computing system 102.

In 460, the sandbox tool 110 can optionally remove the isolated execution environment 230 at the request of the user. For example, to remove the isolated execution environment, the sandbox tool 110 can stop or instruct the processor server module 315 to stop the new virtual process server associated with the isolated execution environment 230. Likewise, the sandbox tool 110 can delete or instruct the namespace module 305 to delete the namespace (e.g. delete the home directory and tmp directory). Additionally, the sandbox tool 110 can mount or instruct the namespace 305 to mount the home directory and tmp directory of the user execution environment 220. In 465, the processing can end, repeat or return to any point.

Figure 5A:
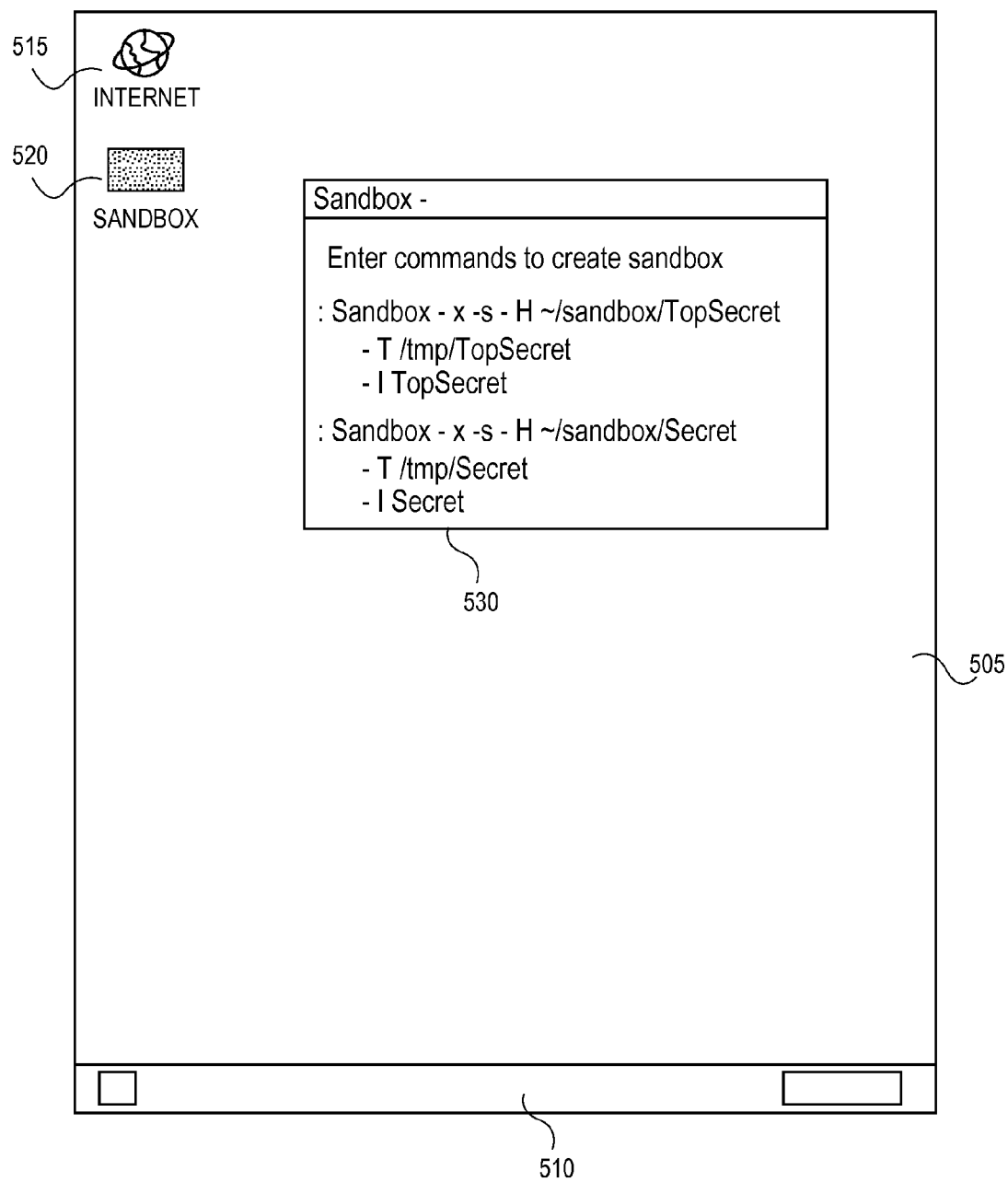
FIGS. 5A and 5B illustrate exemplary interfaces for the isolated execution environment, according to various embodiments.
Figure 5B:
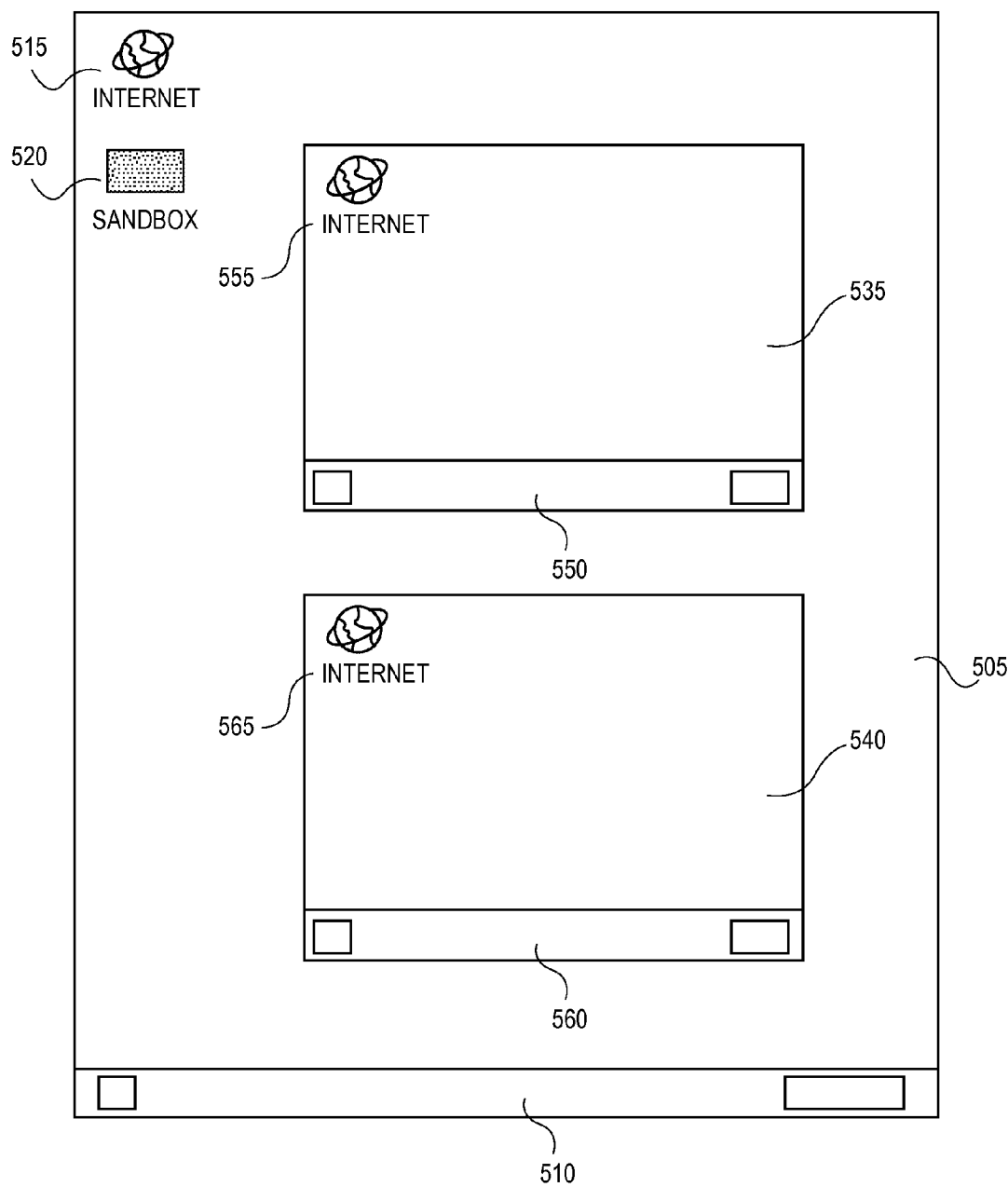

FIGS. 5A and 5B are exemplary screen shots of various methods and processes of initiating creation of two isolated execution environments. As illustrated in FIG. 5A, the secure OS 106, running on the user computing system 102, can provide the user execution environment 220 with a user interface or desktop GUI 505, such as an X Windows interfaces, that allows a user to run applications programs, view files and data, and communicate with the remote computing systems 104. The desktop GUI 505 can include various menus and widgets for accessing application programs, such as a tool bar 510 and application icon 515 for accessing a web browser application program.

The user desktop 505 can include a sandbox icon 520 for initiating the sandbox tool 110. Once the sandbox icon 520 is selected, the sandbox tool 110 can generate and display a sandbox interface 530. The sandbox interface 530 can include fields to allow the user to request creation of isolated execution environments and provide the specifications of the isolated execution environments. In this example, the user can enter commands to create two isolated execution environments. As illustrated, for example, the commands can take the form "sandbox-X-S-H~/sandbox/topsecret-T/tmp/topsecret-1 Topsecret" and "sandbox-X-S-H~/sandbox/secret-T/tmp/secret-1 Secret". The commands define the specifications for the two isolated execution environments as follows:

First Isolated Execution Environment
namespace: "~/sandbox/topsecret" and "/tmp/topsecret"
security context: "Topsecret"
Second Isolated Execution Environment
namespace: "~/sandbox/secret" and "/tmp/secret"
security context: "Secret"

Once entered, the sandbox tool 110 can create the two isolated execution environments according to the specifications, as described above. As illustrated in FIG. 5B, the sandbox tool 110 can display a user interface 535 for the first isolated execution environment and a user interface 540 for the second isolated execution environment in the desktop GUI 505. The user interface 535 can include various menus and widgets for accessing application programs, such as a tool bar 550 and application icon 555 for accessing a web browser application program. Likewise, the user interface 540 can include various menus and widgets for accessing application programs, such as a tool bar 560 and application icon 565 for accessing the web browser application program.

As described above, the first isolated execution environment and the second isolated execution environment operate at the security context specified by the user. As such, the secure OS will apply the security policies associated with the security context to any action taken by the user in the first isolated execution environment and the second isolated execution environment via the user interface 535 ant the user interface 540, respectively. Likewise, the processes running in the first isolated execution environment and the second isolated execution environment will be assigned security labels associated with the security context.

Figure 6:
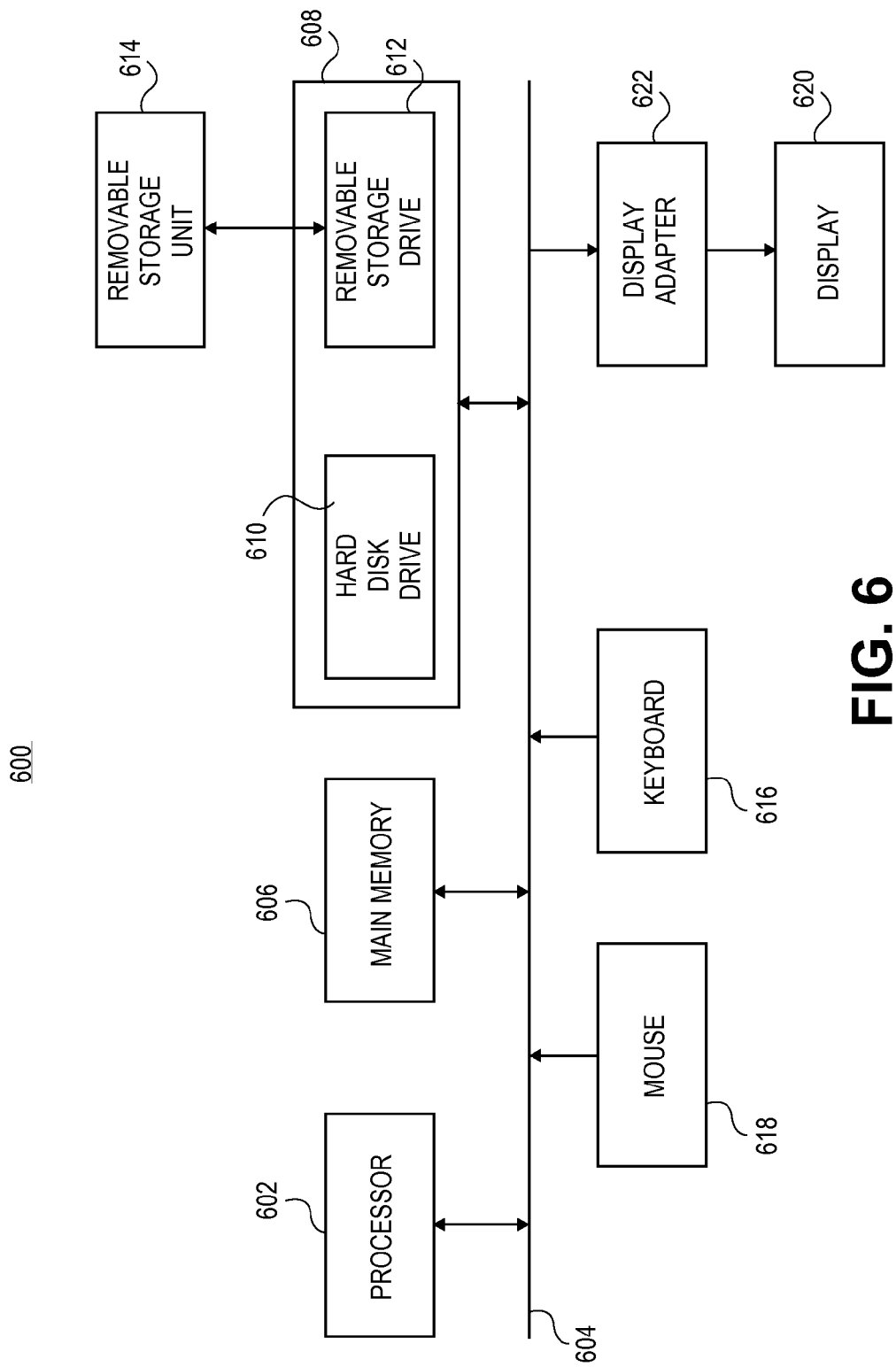
FIG. 6 illustrates an exemplary computing system which can implement the secure operating system and the sandbox tool, according to various embodiments.

FIG. 6 illustrates an exemplary block diagram of a computing system 600 which can be implemented as user computing system 102 and/or the remote computing systems 104 according to various embodiments. The functions of the secure OS 106 and the sandbox tool 110 can be implemented in program code and executed by the computing system 600.

As shown in FIG. 6, the computing system 600 includes one or more processors, such as processor 602 that provide an execution platform for embodiments of the secure OS 106 and the sandbox tool 110. Commands and data from the processor 602 are communicated over a communication bus 604. The computing system 600 also includes a main memory 606, for example, one or more computer readable storage media such as a Random Access Memory (RAM), where the secure OS 106 and the sandbox module 110 can be executed during runtime, and a secondary memory 608. The secondary memory 608 includes, for example, one or more computer readable storage media such as a hard disk drive 610 and/or a removable storage drive 612, representing a floppy diskette drive, a magnetic tape drive, a compact disk drive, etc., where a copy of a software version of the secure OS 106 and the sandbox tool 110 can be stored. The removable storage drive 612 reads from and/or writes to a removable storage unit 614 in a well-known manner. A user can interfaces with the secure OS 106 and the sandbox tool 110 with a keyboard 616, a mouse 618, and a display 620. A display adapter 622 interfaces with the communication bus 604 and the display 620. The display adapter 622 also receives display data from the processor 602 and converts the display data into display commands for the display 620.

Certain embodiments may be performed as a computer application program. The application program may exist in a variety of forms both active and inactive. For example, the application program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the application program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    receiving a request to create an isolated execution environment within a host environment controlled by an operating system;
    creating, by a processing device, a process server to support communications with processes executing in the isolated execution environment;
    assigning a security context to the process server;
    creating, by the processing device, the isolated execution environment associated with the process server and controlled by the operating system, wherein the processes executing in the isolated execution environment execute at the security context;
    initiating, by the processing device, a process in the isolated execution environment; and
    assigning, by the processing device, a security label to the process, wherein the security label is associated with the security context.

2. The method of claim 1, wherein creating the isolated execution environment comprises:
    creating a user interface for the isolated execution environment; and
    displaying the user interface on a display device.

3. The method of claim 1, further comprising:
    associating a namespace with the isolated execution environment; and
    removing access of the namespace to a host environment namespace.

4. The method of claim 3, wherein the request identifies the namespace.

5. The method of claim 1, further comprising:
    receiving a request to initiate the process in the isolated execution environment.

6. The method of claim 1, wherein the process comprises an application program.

7. The method of claim 1, wherein the security context is a multi-level security context.

8. A non-transitory computer readable storage medium containing instructions for causing a processing device to perform operations comprising:
    receiving a request to create an isolated execution environment within a host environment controlled by an operating system;
    creating a process server to support communications with processes executing in the isolated execution environment;
    assigning a security context to the process server;
    creating the isolated execution environment associated with the process server and controlled by the operating system, wherein the processes executing in the isolated execution environment execute at the security context;
    initiating a process in the isolated execution environment; and
    assigning a security label to the process, wherein the security label is associated with the security context.

9. The non-transitory computer readable storage medium of claim 8, wherein creating the isolated execution environment comprises:
    creating a user interface for the isolated execution environment; and
    displaying the user interface on a display device.

10. The non-transitory computer readable storage medium of claim 8, the operations further comprising:
    associating a namespace with the isolated execution environment; and
    removing access of the namespace to a host environment namespace.

11. The non-transitory computer readable storage medium of claim 10, wherein the request identifies the namespace.

12. The non-transitory computer readable storage medium of claim 8, the operations further comprising:
    a request to initiate the process in the isolated execution environment.

13. The non-transitory computer readable storage medium of claim 8, wherein the process comprises an application program.

14. The non-transitory computer readable storage medium of claim 8, wherein the security context is a multi-level security context.

15. A system comprising:
    a memory to store an operating system; and
    a processing device coupled to the memory and to:
        receive a request to create an isolated execution environment within a host environment controlled by the operating system;

create a process server to support communications with processes executing in the isolated execution environment;

assign a security context to the process server;

create the isolated execution environment associated with the process server and controlled by the operating system, wherein the processes executing in the isolated execution environment execute at the security context;

initiate a process in the isolated execution environment; and assign a security label to the process, wherein the security label is associated with the security context.

16. The system of claim 15, further comprising:

a display device coupled to the processing device, wherein the processing device is further to create a user interface for the isolated execution environment associated with the process server and display the user interface on the display device.

17. The system of claim 15, wherein the processing device is further to:

associate a namespace with the isolated execution environment; and remove access of the namespace to a host environment namespace.

18. The system of claim 17, wherein the request identifies the namespace.

19. The system of claim 15, wherein the processing device is further to:

receive a request to initiate the process in the isolated execution environment.

20. The system of claim 15, wherein the security context is a multi-level security context.

* * * * *